(12) United States Patent
Dovey et al.

(10) Patent No.: US 6,702,232 B2
(45) Date of Patent: Mar. 9, 2004

(54) JAM RESISTANT AND INTRUDER-PROOF FLIGHT DECK DOOR

(75) Inventors: John V. Dovey, Seattle, WA (US); Scott P. Kube, Everett, WA (US); John A. Pechacek, Colleyville, TX (US); Rolando G. Taguinod, Renton, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 10/253,571

(22) Filed: Sep. 24, 2002

(65) Prior Publication Data

US 2003/0189130 A1 Oct. 9, 2003

Related U.S. Application Data

(63) Continuation-in-part of application No. 10/117,618, filed on Apr. 5, 2002.

(51) Int. Cl.[7] .............................. B64C 1/14; B64D 13/00
(52) U.S. Cl. ................................ 244/129.4; 244/118.5; 244/129.4; 244/131; 244/121
(58) Field of Search ....................... 244/118.5, 122 AG, 244/129.4, 129.5, 131, 121, 117 R; 89/1.14; 49/33, 50, 61, 62, 63, 64, 65, 66; 292/283, 8, 16, 32

(56) References Cited

U.S. PATENT DOCUMENTS

| | | | | |
|---|---|---|---|---|
| 4,560,123 A | * | 12/1985 | Sealey et al. ............ | 244/129.5 |
| 4,681,286 A | * | 7/1987 | Church et al. ........... | 244/129.5 |
| 6,059,230 A | * | 5/2000 | Leggett et al. ........... | 244/129.5 |
| 6,126,114 A | * | 10/2000 | Victor ...................... | 244/129.5 |
| 6,186,444 B1 | * | 2/2001 | Steel ........................ | 244/129.5 |
| 6,189,833 B1 | * | 2/2001 | Ambrose et al. ........ | 244/129.5 |

* cited by examiner

Primary Examiner—Charles T. Jordan
Assistant Examiner—Stephen Holzen
(74) Attorney, Agent, or Firm—Harness Dickey & Pierce P.L.C.

(57) ABSTRACT

A multi-section aircraft door includes a sliding joint permitting a lower door section displacement into the flight deck area. The door includes an upper door section having a lower edge. The lower edge is connectably joined to an upper member of a two-member sliding joint. The upper member slidably joins to a sliding joint lower member. The sliding joint lower member is connectably joined to a lower door section upper edge. The upper member and the lower member of the two-member sliding joint include paired apertured embossments. A frangible pin slidably mates in each apertured embossment pair. A lever and cam form a frangible pin removal assembly. The lever is held in a normally upright position by either a spring device or a clevis and pin assembly. A rotating clasp or a ball détente system can also replace the frangible pin/apertured embossment and cam/lever.

51 Claims, 16 Drawing Sheets

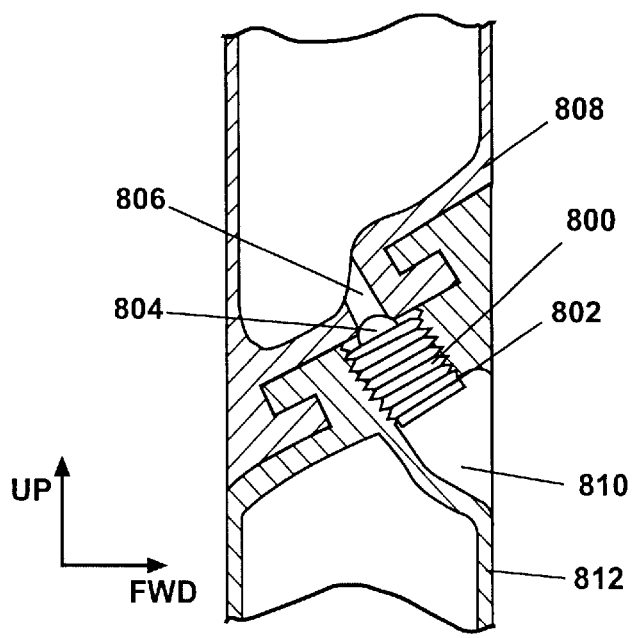
Fig. 16
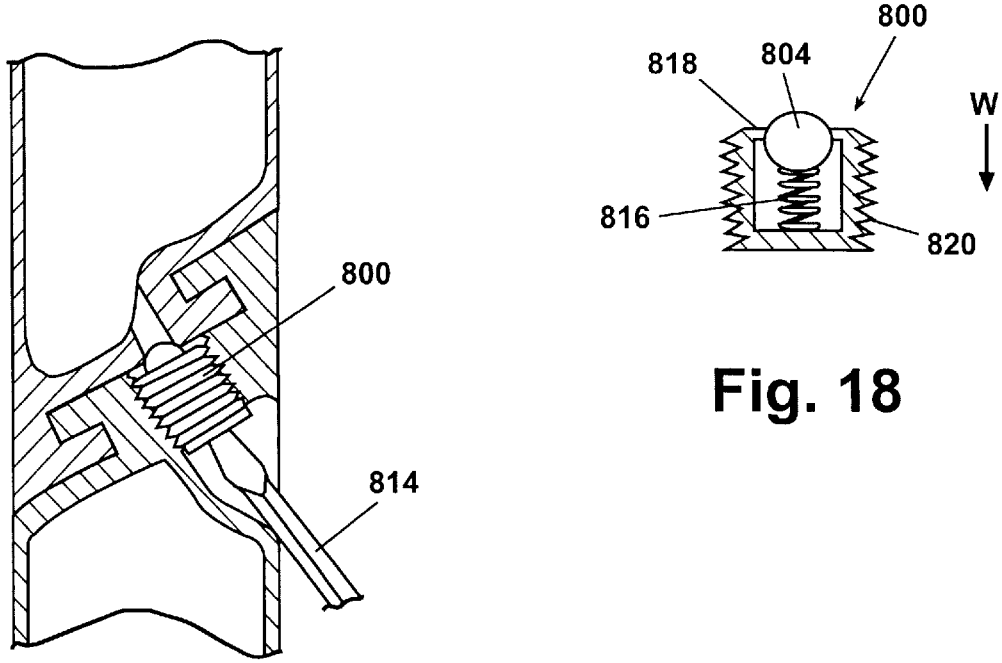
Fig. 17
Fig. 18

JAM RESISTANT AND INTRUDER-PROOF FLIGHT DECK DOOR

CROSS REFERENCE TO RELATED APPLICATION

This application is a continuation-in-part of pending U.S. patent application Ser. No. 10/117,618, filed Apr. 5, 2002. The disclosure of the above application is herein incorporated.

FIELD OF THE INVENTION

The present invention relates in general to aircraft doors and more specifically to both an improved double door sliding joint design and an improved flight deck door.

BACKGROUND OF THE INVENTION

Flight deck or flight cockpit doors on commercial aircraft are now required to be intruder proof, yet maintain jam resistant safety features to aid egress/access. One of the more significant design events affecting a flight deck door of a commercial aircraft is a severe emergency landing. During this event, the forward nose gear of the aircraft forces the deck structure under the flight deck to deflect permanently upwards, which can jam the flight deck door. Common flight deck doors are designed to accommodate this deflection, which can be about 10.2 centimeters (cm) (4 inches) relative movement between the floor and the bottom of the door. An exemplary door design to accommodate deck deflection divides the door into a two section door assembly, otherwise known as a "dutch" door. An aircraft "dutch" door normally has a larger upper door section and a smaller lower door section. The upper door section is hinged to a door frame, allowing the lower door section to accommodate flight deck deflection under the flight deck door. The lower door section includes a telescoping portion or breakaway door panels to aid emergency egress/rescue.

In one exemplary commercial dutch door application, the lower door section is about 35.6 cm (14 in) tall. The lower door section is subdivided into a fixed panel mechanically attached to the larger upper door section, and a telescoping deflection zone to accommodate nose gear/flight deck heave. The deflection zone is designed to deflect upwards into the volume of the fixed panel. The deflection zone is vertically supported, but not horizontally rigid. However, with this dutch door design, an intruder might be able to apply a sufficiently strong forward horizontal force (i.e., by kicking or prying) to the lower door section, dislodging the entire lower section, and through the resulting 14 inch envelope gain access to the flight deck area.

Reducing the height of the lower door section of a dutch door to preclude intruder access to the flight deck area results in a trade-off with the envelope required to accommodate the upward deck deflection caused by nose gear heave. A butted, edge-to-edge door design which offers better horizontal stiffness does not allow the lower door section to displace into the upper door section during a deck displacement event. A unitary door design allowing the lower door portion to crumple during a deck displacement event does not eliminate the potential to jam and prevent access to or emergency egress from the flight deck area.

A simple breakaway lower door section sufficient in size to accommodate deck deflection yet precluding intruder access through the resulting opening is undesirable because it could allow an intruder to force open the lower door section and threaten the operation of the aircraft. It is also undesirable to provide horizontal rigidity to a lower door panel by extending the vertical hinge supporting the upper door section to the lower door section. Extending the hinge would horizontally stiffen the lower door section but it would preclude necessary vertical deflection of the lower section. Extending the hinge to the lower door section edge could also result in damage to the entire hinge section from deck heave, further jamming the entire door assembly.

It is therefore desirable to improve the two section door design of commercial aircraft to provide for flight deck deflection and yet provide an even greater degree of protection against intruder access to the flight deck area.

SUMMARY OF THE INVENTION

According to a preferred embodiment of the present invention, a two section door assembly is provided for an aircraft flight deck door. An upper door section height is increased from known designs. A lower door section height is decreased from known designs to preclude intruder access into the flight deck space. To provide for flight deck deflection from landing gear heave, the lower door section is attached to the upper door section using an angled, sliding joint design. The angled, sliding joint (hereafter referred to as the sliding joint for simplicity) design of the present invention has two major members. The first member, the sliding joint upper member, is mechanically joined to a lower edge of the upper door section. The second member, or sliding joint lower member, is mechanically joined to a lower door section upward facing edge.

The sliding joint upper member and the sliding joint lower member of the present invention form an angle to a horizontal plane taken through the sliding joint. At least one engagement element is disposed on both the sliding joint upper member and the sliding joint lower member. The engagement elements slidably engage each other at the above noted angle and are fixed in place by at least one frangible pin located on the flight deck side of the door assembly. The angle of the sliding joint permits the lower door section to dislodge from the upper door section in a shearing motion when a sufficient vertical force such as the landing gear heave is applied. The angle of the sliding joint together with at least one frangible pin prevent a horizontal force, such as that from an intruder, from dislodging the lower door panel.

The engagement elements of the sliding joint are provided with tight clearances to both vertically support the weight of the lower door section and horizontally stiffen the connection between the lower door section and the upper door section. The angle of the sliding joint resists displacement of the lower door section when a horizontal force is applied from the aft or passenger side of the flight deck door. At least one frangible pin provides a positive feature to lock the lower door section in place against a horizontal displacement. The frangible pin(s) is designed to fracture from the vertical load of the deck displacement, however, the frangible pins will not fracture within the range of horizontal forces a human can apply from the passenger compartment side of the door assembly.

In one aspect of the present invention, the frangible pins are provided as shear pins which have an attached pin retraction element. The pin retraction element allows manual withdrawal of the frangible pins in the event that the lower deck section vertically deflects but the frangible pins do not shear. The frangible pins are located only on the flight deck (aircraft flight crew) side of the door assembly to prevent access from the passenger side of the door assembly.

In another aspect of the invention, a handle is also provided on the door assembly flight deck side to aid in lower door section manual removal.

In one preferred embodiment of the invention, an aircraft door is provided comprising a door upper section having a lower engagement edge, and a door lower section having an upper engagement edge. The lower engagement edge of the door upper section slidably couples with the upper engagement edge of the door lower section to form a sliding joint. The sliding joint is disposed between the two door sections at an angle measured from a horizontal plane passing through the sliding joint. The door upper section is joined to the door lower section by the sliding joint and together form a door assembly.

In another preferred embodiment of the present invention, a method to join sections of an aircraft flight deck door is provided. The method comprises the steps of forming an upper door section having a hinged side edge and a lower edge; fastening the lower edge of the upper door section to the upper member of a two member sliding mechanical joint; slidably joining the upper member of the sliding joint to a lower member of the sliding joint with a combination of an extension element of each member received by a corresponding receiving slot of each member; fastening the lower member of the sliding mechanical joint to an upper edge of the lower door section; disposing the sliding joint between the door sections at an angle measured from a horizontal plane passing through the sliding joint; and rotatably supporting the door about the hinged side of said upper door edge.

In still another preferred embodiment of the present invention, the attached pin retraction element of the frangible pins is provided as a lever and cam assembly. The lever and cam assembly provides additional force to lift the frangible pin(s) out when the vertical load of the deck displacement jams the lower door section but does not shear the frangible pin(s). The lever and cam assembly also provides the force necessary to completely shear a partially sheared frangible pin.

BRIEF DESCRIPTION OF THE DRAWINGS

The present invention will become more fully understood from the detailed description and the accompanying drawings, wherein:

FIG. 4b is an exploded view of the sliding joint of the present invention taken from FIG. 4a;

FIG. 16 is a partial sectioned elevation view showing another preferred embodiment of the present invention having a releasable retention device replacing the frangible pin design;

FIG. 17 is the sectioned elevation view of FIG. 16 further showing adjustment of a ball detente assembly;

FIG. 18 is a sectioned elevation view of the ball detente assembly of FIG. 17;

DETAILED DESCRIPTION OF THE PREFERRED EMBODIMENTS

The following description of the preferred embodiments is merely exemplary in nature and is in no way intended to limit the invention, its application, or uses.

Figure 1:
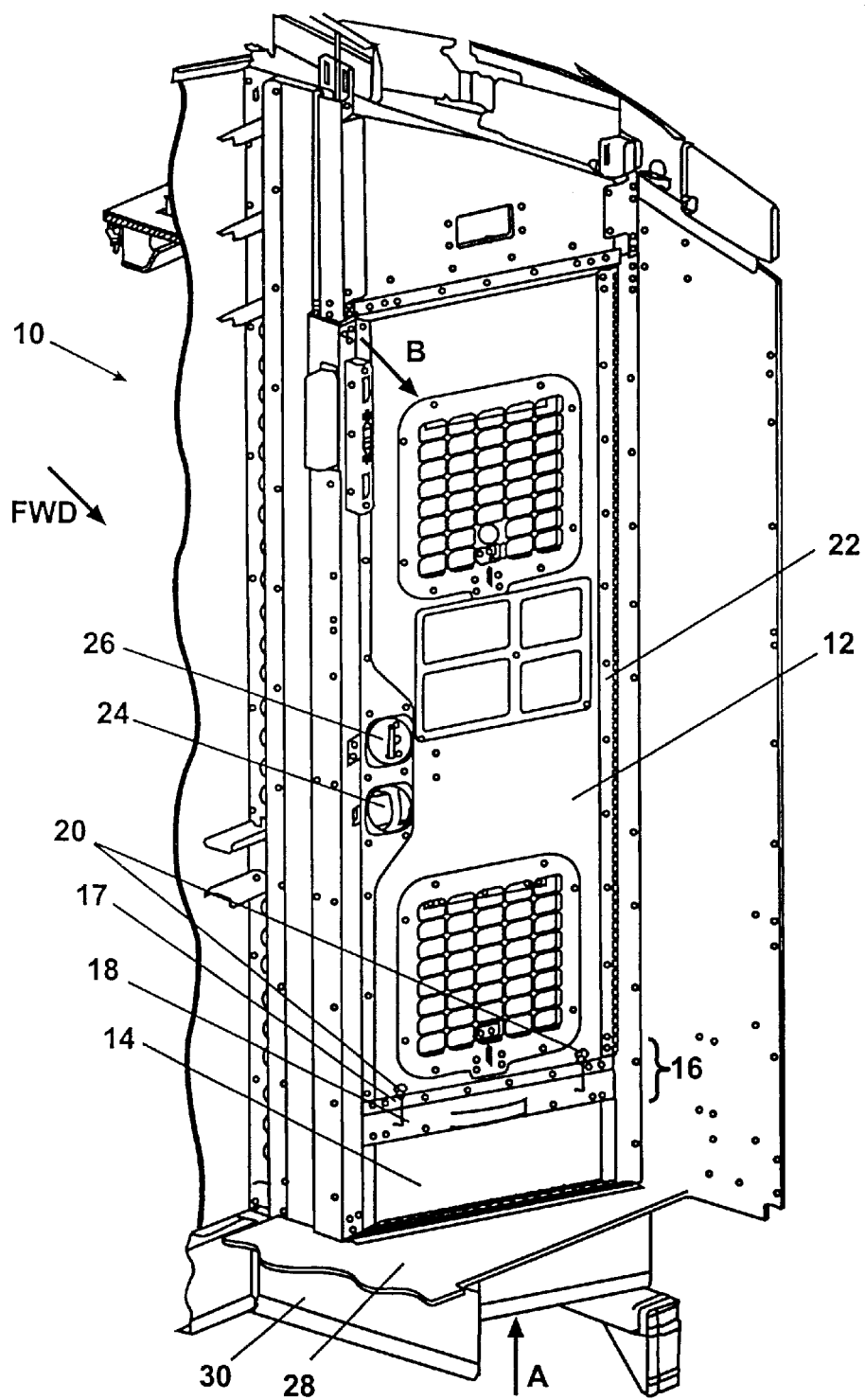
FIG. 1 is a perspective view of an aircraft flight deck door in accordance with a preferred embodiment of the present invention showing an upper and a lower door section connected by a sliding joint.

Referring to FIG. 1, a door assembly 10 in accordance with a preferred embodiment of the present invention is shown. The door assembly 10 comprises an upper door section 12 and a lower door section 14. The upper door section 12 and the lower door section 14 are separated by a sliding joint 16. The sliding joint 16 is comprised of a sliding joint upper member 17 and a sliding joint lower member 18.

Both the sliding joint upper member 17 and the sliding joint lower member 18 are held in position and prevented from being displaced by at least a pair of frangible pins 20. The door assembly 10 further comprises a hinge 22, a door knob 24, and a latch bolt 26. The door knob 24 and the latch bolt 26 normally hold the door assembly 10 in a closed position. The door assembly 10 rotates between the closed and open position (not shown) about the hinge 22.

FIG. 1 further shows the door assembly 10 is supported from aircraft structure, including a flight deck 28 which is supported by a deck support structure 30. In the event of an emergency landing, the aircraft strut structure (not shown) induces a deflection force in the deck displacement direction of arrow A. The door assembly 10 is normally positioned in a closed position (shown), and is prevented from binding closed by the door assembly of the present invention. In normal use, the door assembly 10 will swing from the door closed position shown to the door open position (not shown) in the door rotation direction B. In many commercial aircraft, the door assembly 10 is desirably positioned to rotate in the door rotation direction B such that the door opens into the flight deck area, on the forward side of the door assembly 10. The frangible pins 20 are located on the forward facing side of the door assembly 10 such that the frangible pins 20 are accessible to aircraft flight personnel for quick removal in the event of an emergency egress from the flight deck area.

Figure 2:
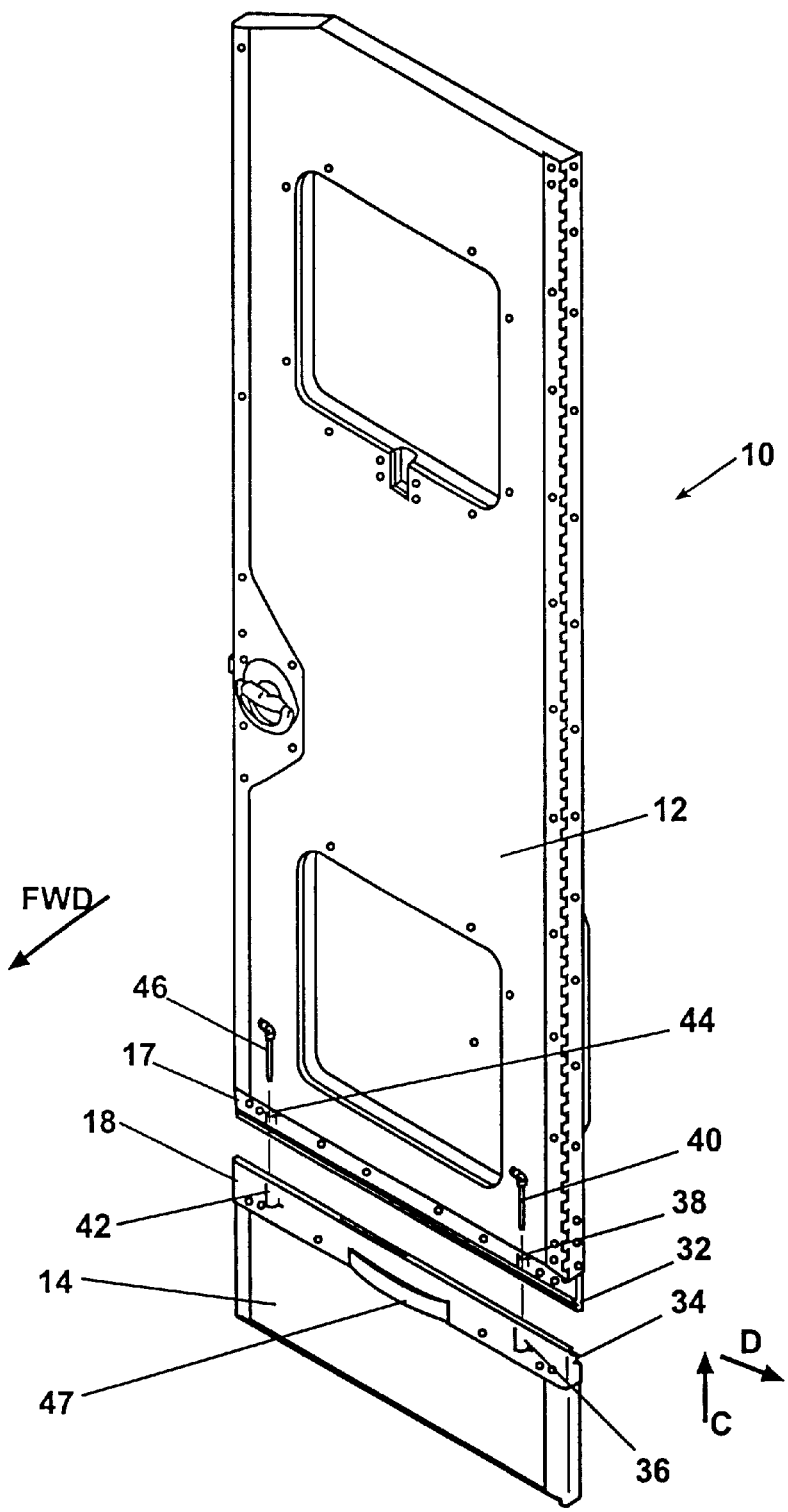
FIG. 2 is a perspective drawing of the door of FIG. 1 showing the forward facing sides of the door and the removable, frangible pins locking the joint sections together.

Referring now to FIG. 2, the door assembly 10 is further shown prior to assembly of the components. The upper door section 12 has the sliding joint upper member 17 supported from a lower edge thereof. The lower door section 14 has the sliding joint lower member 18 supported from an upper edge thereof. The sliding joint upper member 17 further includes a lower engagement edge 32, and the sliding joint lower member 18 further includes an upper engagement edge 34.

A blind apertured embossment 36 is provided on the sliding joint lower member 18. The blind apertured embossment 36 coaxially aligns with an apertured embossment 38 disposed on the sliding joint upper member 17. A frangible pin 40 slides through the coaxially aligned apertured embossment 38 and into the blind apertured embossment 36 to lock the sliding joint 16 into its assembled position. Similarly, a blind apertured embossment 42 is also disposed on the sliding joint lower member 18 in coaxial alignment with an apertured embossment 44 disposed on the sliding joint upper member 17. A frangible pin 46 is received through the apertured embossment 44 and into the blind apertured embossment 42 to additionally support the sliding joint 16 in its assembled position. The blind apertured embossments 36 and 42, respectively, are provided with blind, or predetermined, depth apertures to support each of the frangible pins 40 and 46. The blind apertured embossments 36 and 42, respectively, can also be provided as through-apertured embossments.

To join the sliding joint upper member 17 to the sliding joint lower member 18, the lower door section 14 having the sliding joint lower member 18 attached is translated in a vertical direction indicated by arrow C until the upper engagement edge 34 of the sliding joint lower member 18 is adjacent to the lower engagement edge 32 attached to the sliding joint upper member 17. The upper engagement edge 34 is then joined to the lower engagement edge 32 by positioning the sliding joint lower member 18 together with the lower door section 14 in the direction of arrow D. The frangible pin 40 and the frangible pin 46 are then positioned to lock the sliding joint members together. A handle 47 is also shown attached to the sliding joint lower member 18 to aid in manual removal or positioning of the lower door section 14.

Figure 3:
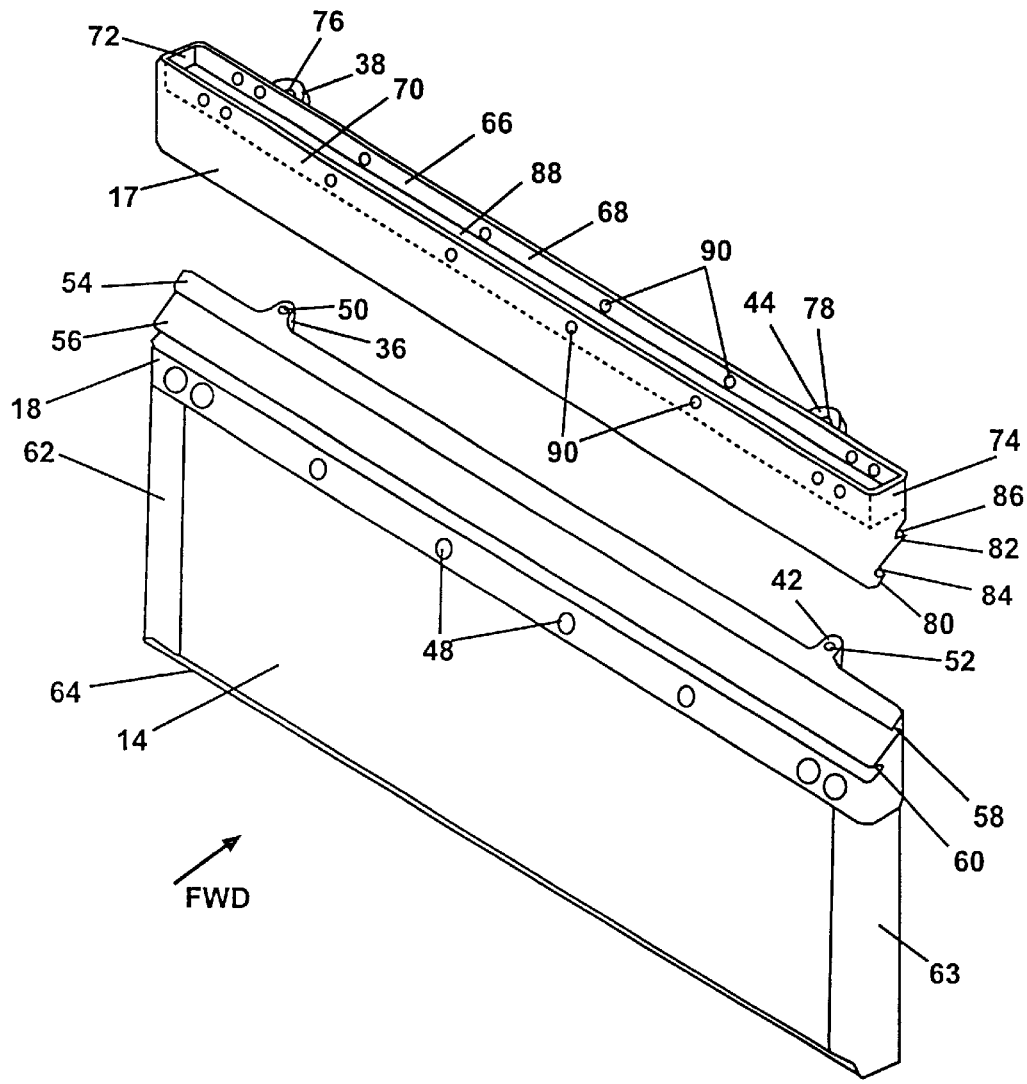
FIG. 3 is a perspective view of the two sliding joint members of the present invention.

Referring now to FIG. 3, the sliding joint upper member 17 and the sliding joint lower member 18 are shown in greater detail. The sliding joint lower member 18 is positioned over an upper edge (not visible in this view) of the lower door section 14 as shown. A plurality of fasteners 48 are inserted to mechanically fasten the sliding joint lower member 18 to the lower door section 14. An adhesive, such as an epoxy (shown in FIG. 4B), can also be applied between the connecting faces of the lower door section 14 and the sliding joint lower member 18. The blind apertured embossment 36 is shown with its blind aperture 50, and the blind apertured embossment 42 is shown with its blind aperture 52. The sliding joint lower member 18 further includes a distal engagement element 54 and a proximate engagement element 56. A first engagement recess 58 is formed at the junction between the distal engagement element 54 and the sliding joint lower member 18, and a second engagement recess 60 is formed at the junction between the proximate engagement element 56 and the sliding joint lower member 18.

Additional reinforcement is also shown in FIG. 3 for the lower door section 14. Both an edge reinforcement channel 62 and an edge reinforcement channel 63 are shown in their positions on the lower door section 14. A bottom reinforcement plate 64 is also shown attached to the bottom edge of the lower door section 14.

The sliding joint upper member 17 is shown having the upper door section 12 removed for clarity. The sliding joint upper member 17 has a channel 66 longitudinally formed on one edge thereof. About a perimeter of the channel 66 is disposed a longitudinal wall 68, a longitudinal wall 70, an end wall 72 and an end wall 74. The end wall 72 and the end wall 74 can optionally be eliminated. The purpose of the channel 66 is to enclose and provide support between the sliding joint upper member 17 and the upper door section 12 (not shown). FIG. 3 also shows the apertured embossment 38 having a through-bore 76 and the apertured embossment 44 is shown having a through-bore 78. The through-bore 76 and the through-bore 78 provide a clearance fit for the frangible pins 40 and 46 respectively (shown in FIG. 2). The sliding joint lower member 18 has a similar channel (not shown for clarity) to the channel 66 of the sliding joint upper member 17.

The sliding joint upper member 17 also includes a distal engagement element 80 and a proximate engagement element 82. A distal engagement recess 84 is formed at the junction between the distal engagement element 80 and the sliding joint upper member 17, and a proximate engagement recess 86 is formed at the junction between the proximate engagement element 82 and the sliding joint upper member 17. In use, the upper door section 12 will abut with a channel bottom face 88. A plurality of fastener apertures 90 are provided in the longitudinal wall 68 and the longitudinal wall 70. Fastener apertures 90 are formed as pairs of fastener apertures along common centerlines such that an individual fastener (not shown) can be inserted into each of the fastener apertures. Optionally, a single fastener can be inserted through any two of the fastener apertures 90 paired on a common centerline.

Figure 4B:
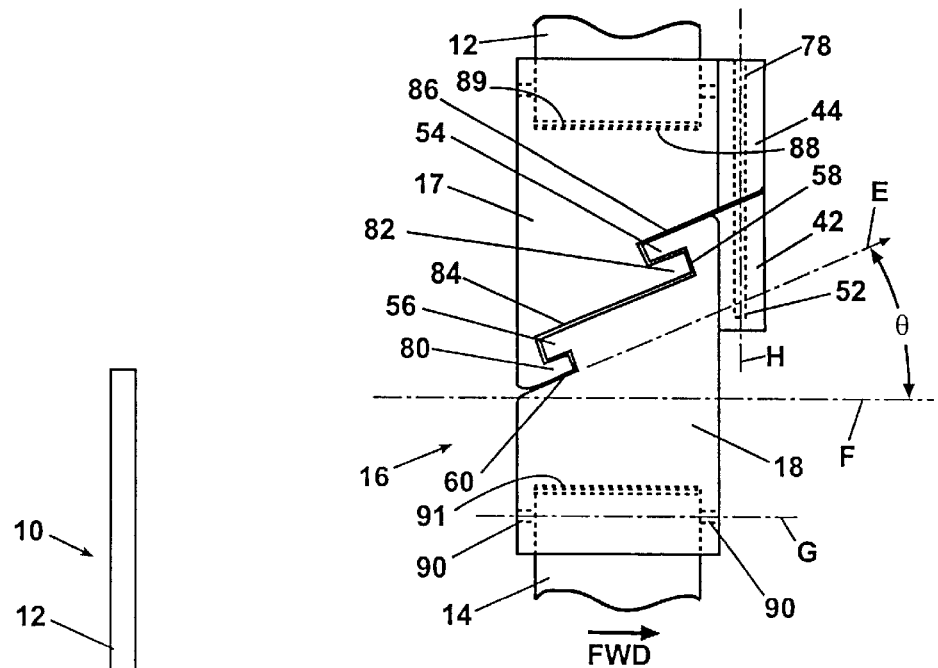
Figure 4A:
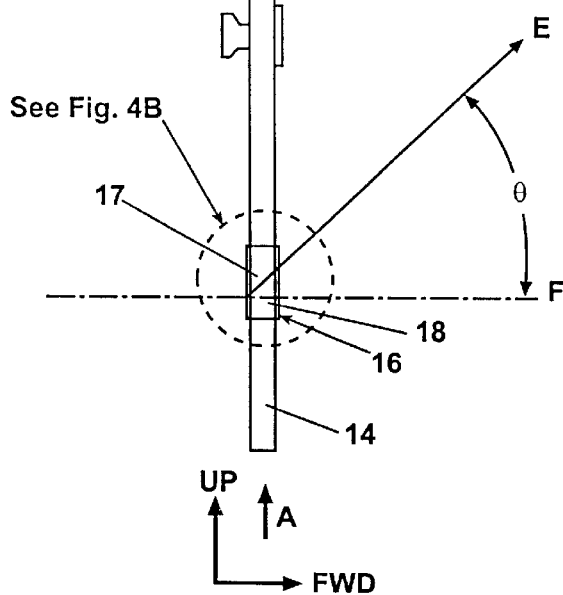
FIG. 4a is a side elevation view of a flight deck door assembly of the present invention showing the angle formed between the sliding joint sections of the sliding joint.

Referring now to FIGS. 4A and 4B, a side elevation view of a door assembly 10 having a sliding joint of the present invention is shown. FIG. 4A shows a sliding joint 16 installed such that the sliding joint upper member 17 and the sliding joint lower member 18 are aligned to form an angle $\theta$. The angle $\theta$ is measured between a sliding joint centerline E and a horizontal plane F taken through the sliding joint 16. Angle $\theta$ can vary between about 20° up to about 70°. In one preferred embodiment of the present invention, angle θ is approximately 30°. Using an angle θ of about 30° reduces the length of the sliding joint 16 members measured along the arrow of sliding joint centerline E, but permits the sliding joint lower member 18 to displace in the direction of the arrow of the sliding joint centerline E upon a flight deck (not shown) deflection in the vertical direction indicated as deck displacement direction A. A flight deck displacement in the deck displacement direction A will displace the sliding joint lower member 18 in the general direction shown as the joint centerline arrow E. This displacement will shear the frangible pin 40 and the frangible pin 46 shown in FIG. 2, separating the lower door section 14 from the upper door section 12. The range of angles for angle θ permits various geometries of the sliding joint 16.

Referring now to FIG. 4B, an exploded view of the sliding joint 16 of FIG. 4A is shown. FIG. 4B shows the sliding joint upper member 17 and the sliding joint lower member 18 of the present invention connected to the upper door section 12 and the lower door section 14 respectively. The sliding joint centerline E shows the orientation of the plurality of engagement elements of the sliding joint 16. The elements of the sliding joint 16 include the distal engagement element 54 and the proximate engagement element 56 of the sliding joint lower member 18, and the distal engagement element 80 and the proximate engagement element 82 of the sliding joint upper member 17 respectively.

In the exemplary design shown in FIG. 4B, the distal engagement element 54 of the sliding joint lower member 18 engages with the proximate engagement recess 86 of the sliding joint upper member 17. The proximate engagement element 56 of the sliding joint lower member 18 engages with the distal engagement recess 84 of the sliding joint upper member 17. The distal engagement element 80 of the sliding joint upper member 17 engages with the second engagement recess 60 of the sliding joint lower member 18. Similarly, the proximate engagement element 82 of the sliding joint upper member 17 engages within the first engagement recess 58 of the sliding joint lower member 18.

In the exemplary arrangement shown by FIG. 4B, the apertured embossment 44 is shown aligned with the blind apertured embossment 42. The through-bore 78 is coaxially aligned with the blind aperture 52 along a common bore centerline H. Both the through-bore 78 and the blind aperture 52 are shown in phantom in FIG. 4B. An exemplary pair of fastener apertures 90 are also shown in phantom in FIG. 4B along a common through-bore centerline G. An optional layer of adhesive 89 (shown in phantom in FIG. 4B) is also shown between the upper door section 12 and the channel bottom face 88 (shown in phantom in FIG. 4B) of the sliding joint upper member 17. A similar layer of adhesive 91 assists in joining the lower door section 14 to the sliding joint lower member 18.

It is important to note that the blind apertured embossment 36, the apertured embossment 38, the blind apertured embossment 42 and its corresponding apertured embossment 44 are all positioned on the forward facing side of the sliding joint 16. Access to the frangible pin 40 and the frangible pin 46 (shown in FIG. 2) is therefore provided to aircraft flight personnel within the flight deck area on the forward facing side of the door assembly 10. Access to these pins is therefore denied to personnel in the aft personnel spaces of the aircraft.

Figure 5:
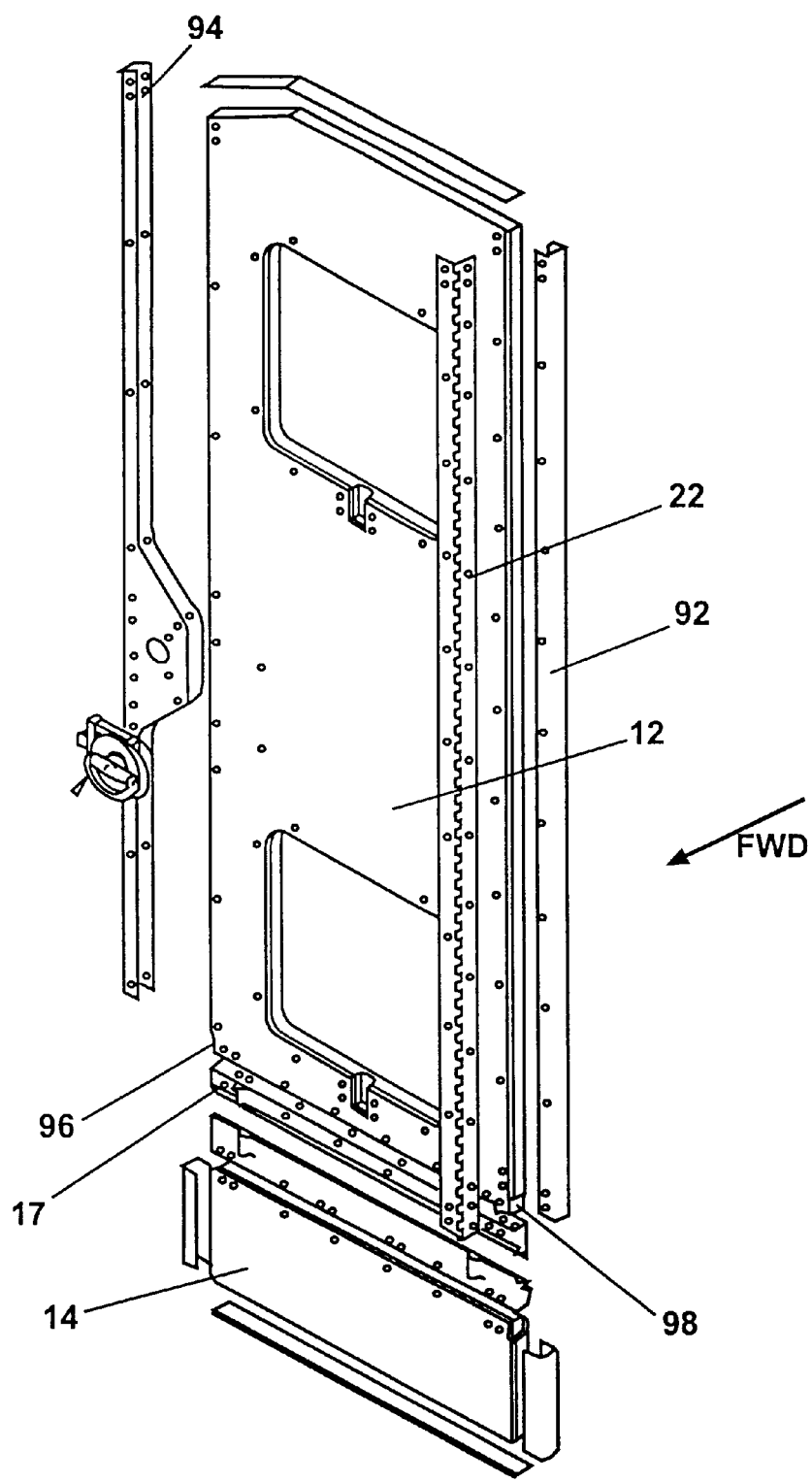
FIG. 5 is a perspective view of an assembly of components for a flight deck door including the sliding joint design of the present invention.

Referring to FIG. 5, further details of the upper door section 12 are shown providing for attachment of the sliding joint upper member 17. As shown in FIG. 5, an upper door edge reinforcement 92 and an upper door latch edge 94 are shown prior to assembly. The hinge 22 is also shown in its preassembly position. A latch side notch 96 and a hinge side notch 98 are shown in the lower portion of the upper door section 12. The latch side notch 96 and the hinge side notch 98 are provided to permit the upper door section 12 to fit within the channel 66 formed in the sliding joint upper member 17 (shown in detail in FIG. 3). Similar notches are also shown in the lower door section 14 for the same purpose.

Figures 6A, 6B:
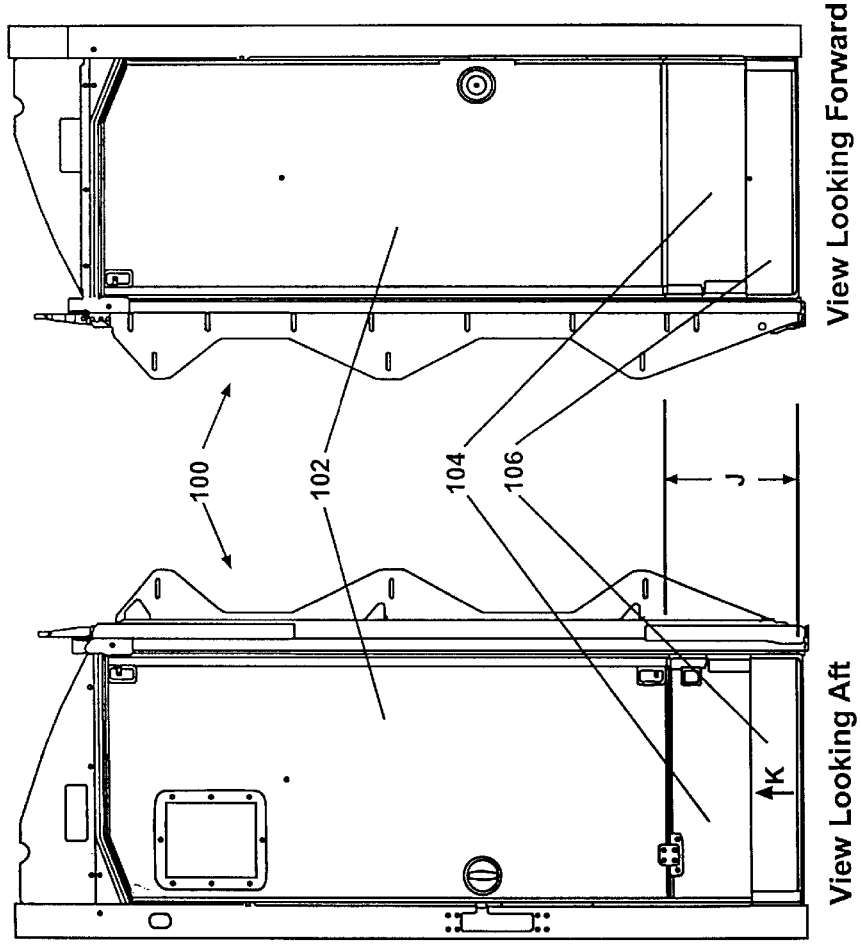
FIG. 6A is an elevation view looking aft of an exemplary door known in the art, showing a two section flight deck door assembly, the two sections separated by an internally collapsing joint.
FIG. 6B is an elevation view looking forward of the exemplary door known in the art shown in FIG. 6A.

Referring to FIGS. 6A and 6B, a door assembly 100 known in the art is shown in a closed position. FIG. 6A is a view from the flight deck area looking aft at the door assembly 100. FIG. 6B is a view from the passenger compartment side looking forward at the door assembly 100. The door assembly 100 comprises an upper door section 102 and a lower door section 104. A displacement panel 106 is also provided for the lower door section 104. The purpose of the displacement panel 106 is to permit a vertical deflection in a lower door section displacement direction K as shown in FIG. 6A. This deflection results from the emergency landing of an aircraft providing the flight deck displacement previously discussed. As shown in FIG. 6A, a lower door section height "J" results from the combination of the lower door section 104 and the displacement panel 106. A typical height for the lower door section height J is about 35.6 cm (14 in). By applying a horizontal force, i.e., in the forward direction or from the door assembly 100 side as viewed in FIG. 6B, a person in the personnel spaces of the aircraft could force the lower door section 104 forward and thus gain entry into the flight deck area of the aircraft. The large space provided, i.e., about 35.6 cm, is sufficient for a person to enter the cockpit area (not shown).

Figure 7:
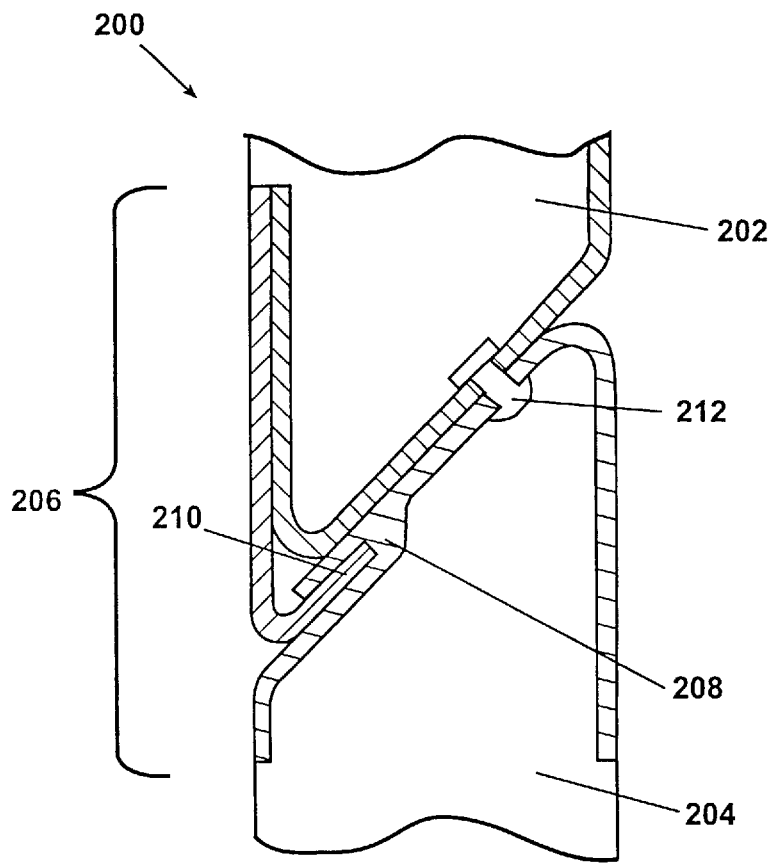
FIG. 7 is a partial section view of a modified two element sliding joint design of the present invention having a single engagement member on each element and the elements joined by a riveted fastener.
Figure 8:
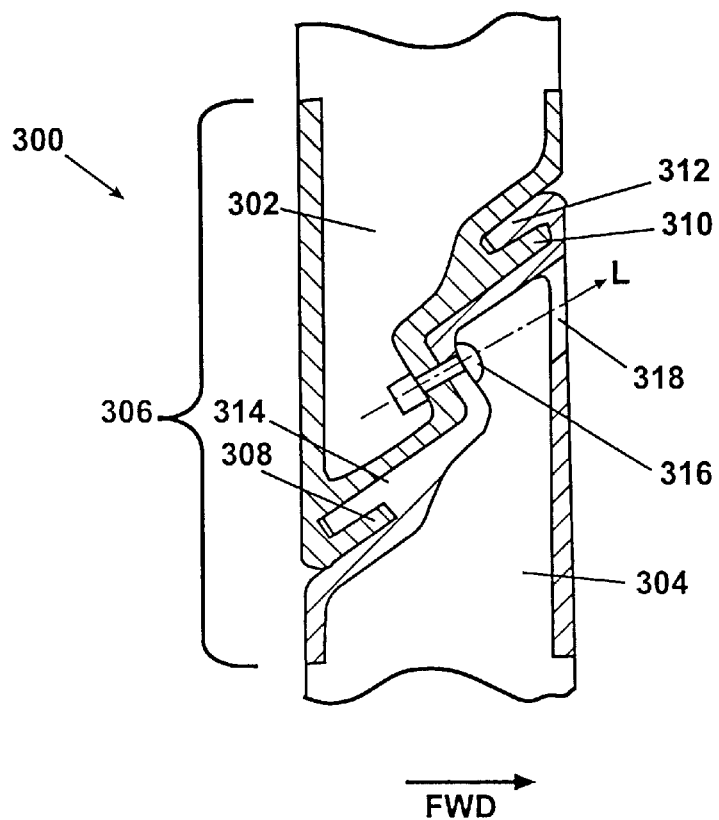
FIG. 8 is a partial section view of a modified two element sliding joint design of the present invention, including two engagement members and a tensile frangible pin joining the sliding joint elements.
Figure 9:
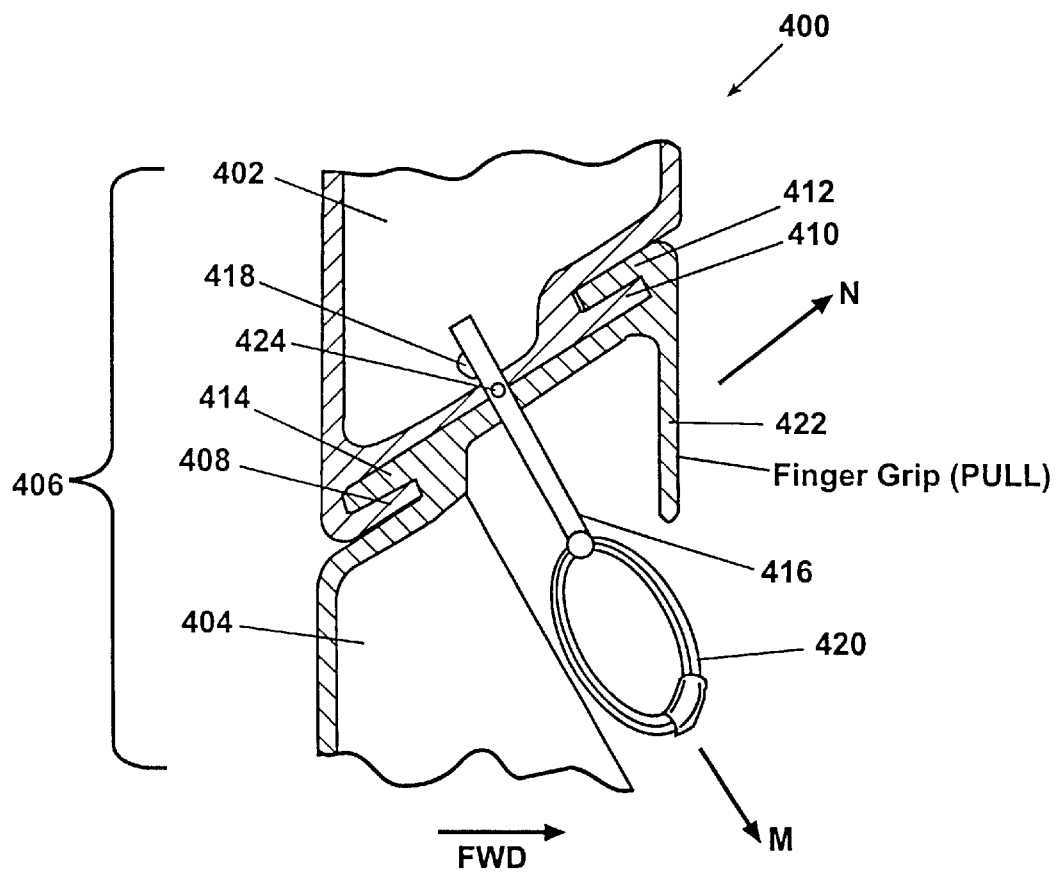
FIG. 9 is a partial section view of a modified two element sliding joint design of the present invention, including two engagement members, a sliding shear pin, and a pin retraction element.

FIGS. 7, 8 and 9 provide additional preferred embodiments for the sliding joint of the present invention. Referring to FIG. 7, a partial door assembly 200 is shown. The partial door assembly 200 comprises an upper door section 202 and a lower door section 204 joined by a riveted joint 206. The riveted joint 206 comprises a single receiving member 208 and a single insertion member 210. A shearable rivet 212 joins the sections of the riveted joint 206 together. Similar to the sliding joint detailed in FIG. 3, the riveted joint 206 of FIG. 7 permits a vertical flight deck deflection to shear the shearable rivet 212 and allow the lower door section 204 to displace from the upper door section 202. There is no manual release feature provided for the riveted joint 206.

Referring to FIG. 8, a partial door assembly 300 is shown. The partial door assembly 300 comprises an upper door section 302 and a lower door section 304 joined by a riveted joint 306. The riveted joint 306 differs from the riveted joint 206 shown in FIG. 7 in that the riveted joint 306 employs two engagement elements. The riveted joint 306 includes a distal engagement element 308 and a proximate engagement element 310 respectively for the upper door section 302 of the riveted joint 306. The lower door section 304 of the riveted joint 306 is similarly provided with a distal engagement element 312 and a proximate engagement element 314. In the riveted joint 306 shown in FIG. 8, a tensile frangible rivet 316 is used. The tensile frangible rivet 316 is installed via the aperture 318. During an aircraft emergency landing, the tensile frangible rivet 316 does not shear but yields in the direction of arrow L as shown. When the tensile frangible rivet 316 yields, the lower door section 304 displaces from the upper door section 302 in the direction of arrow L.

Referring to FIG. 9, a partial door assembly 400 is shown. The partial door assembly 400 comprises an upper door section 402 and a lower door section 404 separated by a pinned joint 406. The pinned joint 406 includes a distal engagement element 408 and a proximate engagement element 410 on the upper door section 402 of the pinned joint 406. The pinned joint 406 also includes a distal engagement element 412 and a proximate engagement element 414 on the lower door section 404 of the pinned joint 406. The shear pin 416 is employed in the pinned joint 406 to retain the two joint sections. The shear pin 416 has a shear pin retention element 418 to prevent the shear pin 416 from coming loose during aircraft operation. The shear pin 416 also uses a pin retraction element 420 to extract the frangible pin 416 manually. The pin retraction element 420 is shown as a ring, however, any shape providing for a manual gripping surface, such as a flat area, a large diameter area or a knurled gripping area can be used. The partial door assembly 400 and the pinned joint 406 also employ a finger grip surface 422 to permit manual displacement of the lower door section 404 in the direction indicated as arrow N after removal of the shear pin 416. The frangible pin 416 is manually removed in the direction of arrow M as shown.

FIG. 9 also identifies an aperture 424 in the frangible pin 416. The aperture 424 is optionally provided to enable frangible pin 416 to fracture (i.e., shear) at a predetermined load. Other geometric shapes, as known in the art, can also be substituted for the aperture 424 to achieve fracture, including a notch or a circumferential groove about the frangible pin. The same concept can also be applied to the frangible pins 40 and 46 respectively, shown in FIG. 2, the shearable rivet 212 (of FIG. 7), or to control the yield point of the tensile frangible rivet 316 (of FIG. 8).

Figure 10:
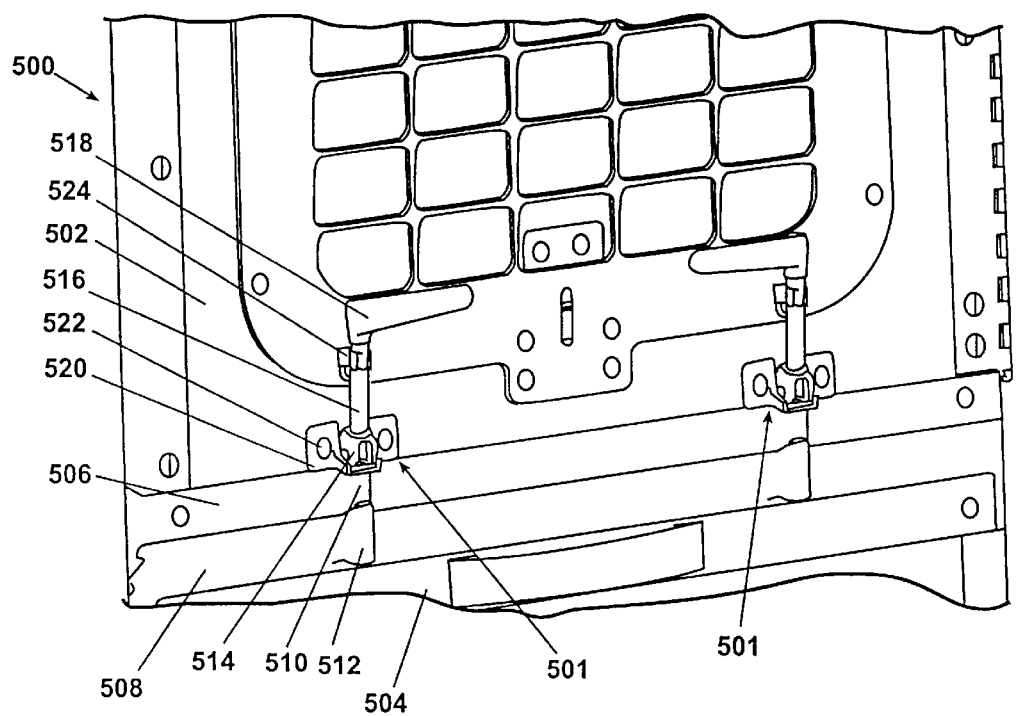
FIG. 10 is a partial perspective view of the door of FIG. 1 showing the forward facing sides of the door at the interface between the upper door section and the lower door section, further showing the lever and cam embodiment of the frangible pin retraction element.

Referring to FIG. 10, in another preferred embodiment of the present invention each frangible pin is removed by a manual removal device. The manual removal device provides mechanical leverage to either remove the frangible pin or shear a jammed frangible pin. A door assembly 500 similar to door assembly 10 (shown in FIG. 1) provides an upper door section 502 and a lower door section 504. A sliding joint upper member 506 is connected to the upper door section 502. A sliding joint lower member 508 is connected to the lower door section 504. At least one upper apertured embossment 510 is provided with the sliding joint upper member 506. At least one lower apertured embossment 512 is provided with the sliding joint lower member 508 each in alignment with one of the upper apertured embossments 510 to form pairs of apertured embossments.

At least one frangible pin removal assembly 501 is provided for each pair of apertured embossments to remove the frangible pins of the door assembly 500. Each frangible pin removable assembly 501 comprises a cam 514, a lever 516 connected to the cam 514, a handle 518 connected to the lever 516, and a flange assembly 520 for rotatably mounting the cam 514. Each frangible pin removal assembly 501 is mounted on the flange assembly 520 which is in turn fastenably attached to the upper door section 502 using a plurality of fasteners 522. A spring mechanism 524 is used to retain the lever 516 in an upright position in a normal condition.

Figure 11:
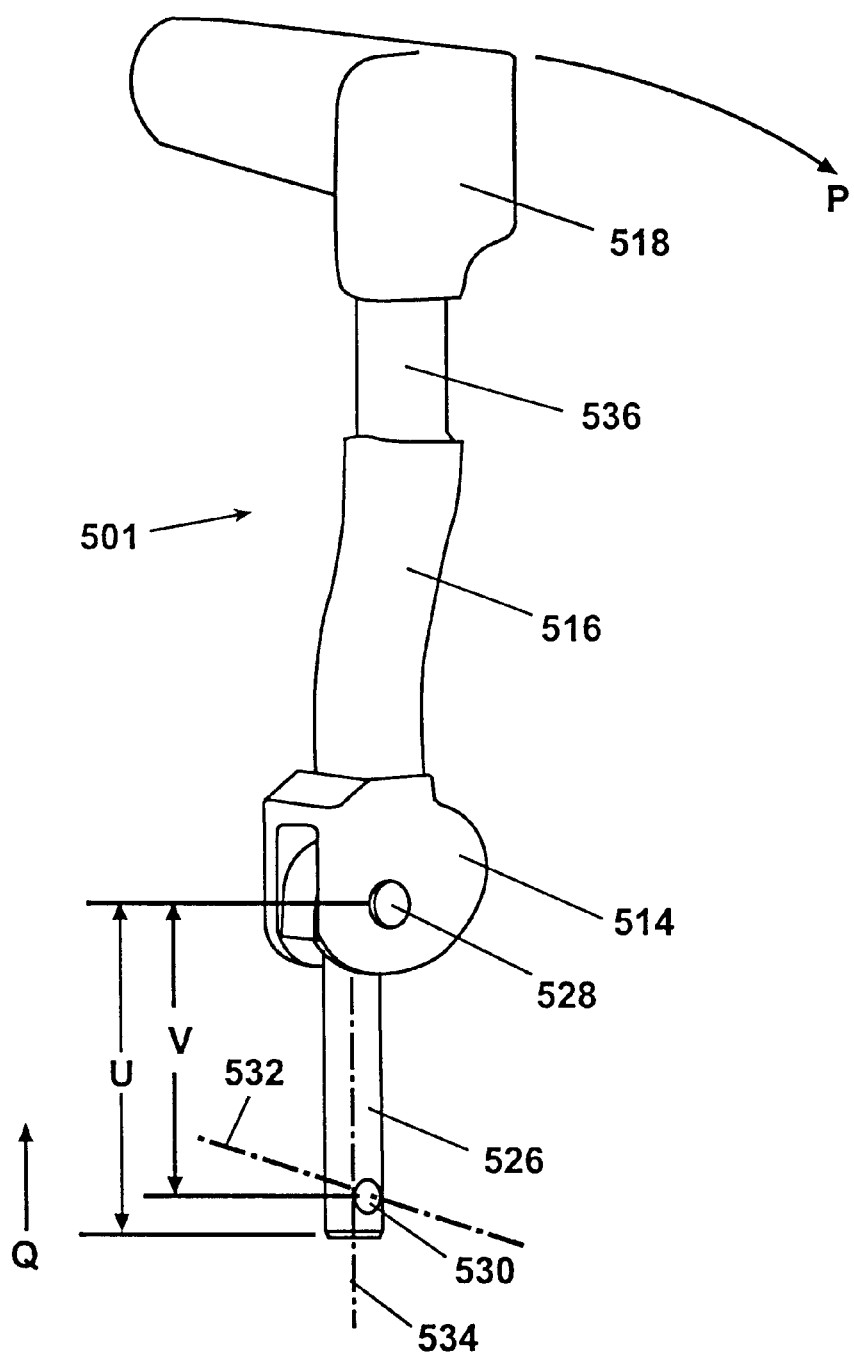
FIG. 11 is a perspective view of the lever and cam embodiment of the frangible pin retraction element and its associated frangible pin.

Referring to FIG. 11, an exemplary frangible pin removal assembly 501 is shown in greater detail. The cam 514 is fixedly attached to or integrally provided with the lever 516. The lever 516 will typically have an offset in order to position the handle 518 away from the upper door section 502 sufficient for an operator (not shown) to reach between the upper door section 502 and the handle 518 to grasp the handle 518. Between the lever 516 and the handle 518, a notch 536 is provided which will be discussed in further detail below in reference to FIG. 12. Each frangible pin removal assembly 501 further includes a frangible pin 526 connected to the cam 514 by a roll pin 528. The frangible pin 526 has a pin aperture 530 machined there through to provide the location for the frangible pin 526 to shear. The pin aperture 530 is located on a pin aperture centerline 532. The pin aperture centerline 532 is located approximately perpendicular to a pin longitudinal axis 534. When the handle 518 is rotated in the handle rotation direction P about the roll pin 528, the frangible pin 526 is vertically displaced in the pin displacement direction Q.

Figure 12:
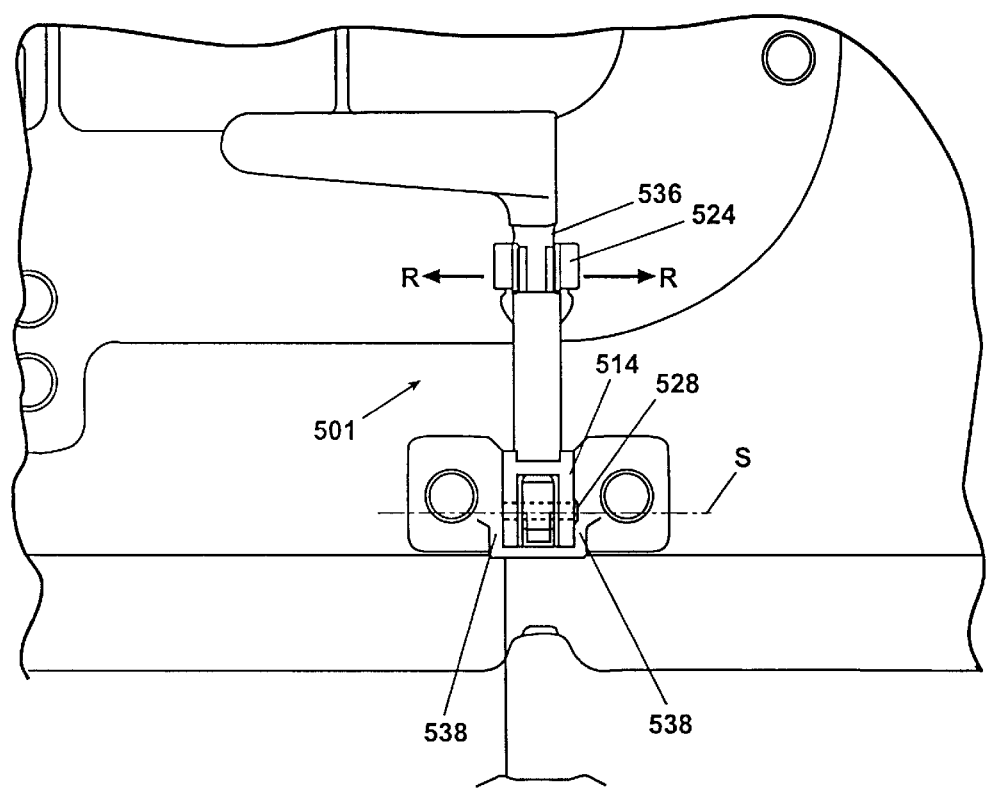
FIG. 12 is an elevation view looking aft showing the lever and cam embodiment of the frangible pin retraction element in its upright or normally stowed position.

Referring to FIG. 12, a normal position of the frangible pin removal assembly 501 is shown. The spring mechanism 524 grasps the notch 536 area of the lever 516. To engage the notch 536 in the spring mechanism 524, the notch 536 outwardly displaces the spring mechanism 524 in the spring release direction R as shown. The spring mechanism 524 thereafter retains the frangible pin removable assembly 501 in the approximately vertical or upright position shown. The cam 514 is slidably retained by a pair of raised ridges 538. The raised ridges 538 prevent the frangible pin removal assembly 501 from twisting in a direction different from the handle rotation direction P shown in both FIG. 11 and FIG. 13. The frangible pin removal assembly 501 rotates about a pin axis of rotation S. The pin axis of rotation S is through a longitudinal centerline (not shown) of the roll pin 528.

Figure 13:
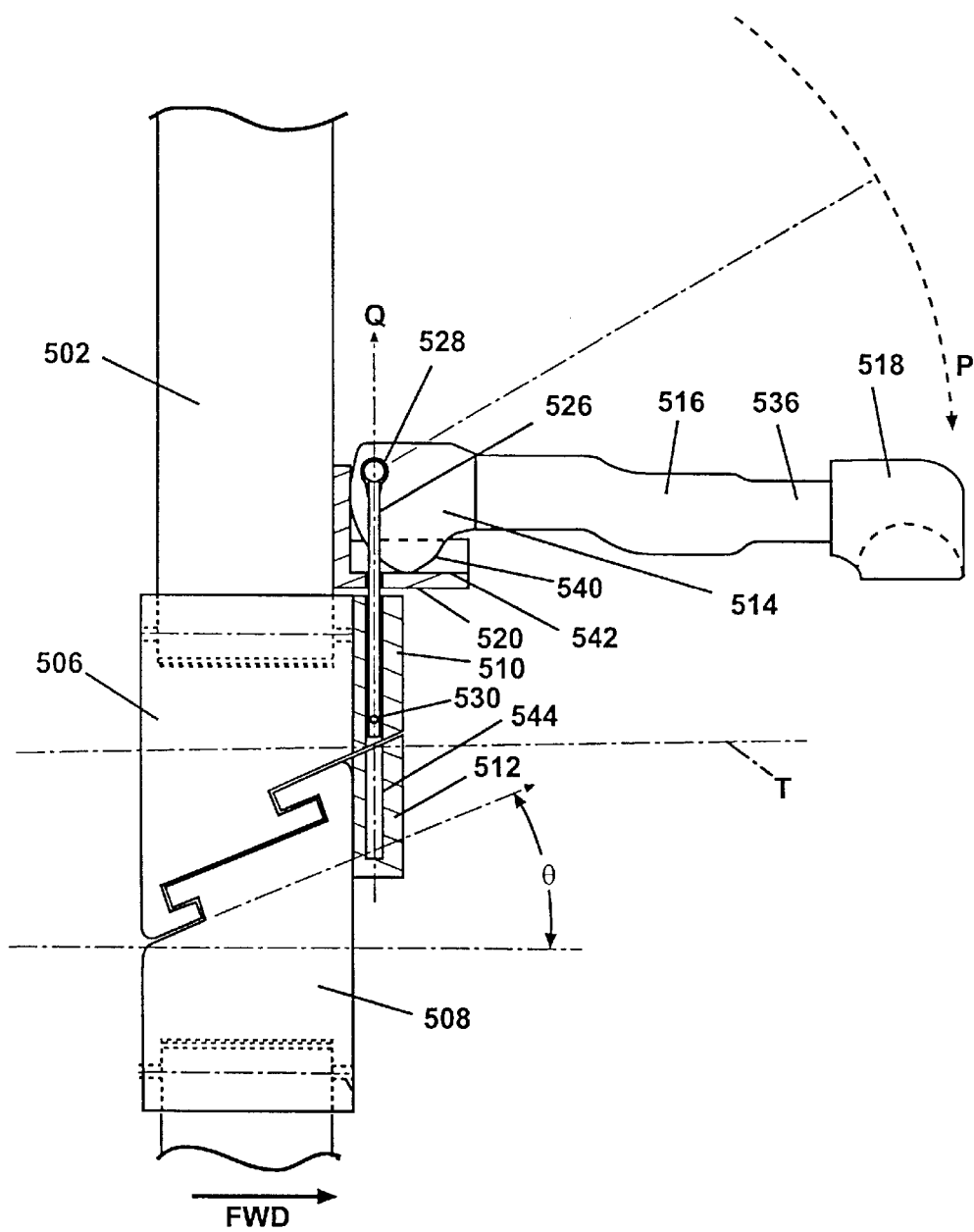
FIG. 13 is a partial section, side elevation view taken through section 13—13 of FIG. 12, showing a lever and cam in their rotated pin retraction position.

Referring to FIG. 13, the frangible pin removal assembly 501 is shown rotated from its normal upright position. FIG. 13 is a side elevation view showing the apertured embossments 510 and 512 and the flange assembly 520 in partial section view. The upper door section 502 is shown seated in the sliding joint upper member 506. The handle 518 and the lever 516 (connected to the cam 514) rotate about the handle rotation direction P to a position which is approximately perpendicular to the starting or normal position of the frangible pin removable assembly 501. The handle 518 and the lever 516 can rotate further through about 120 degrees rotation from the normal position. An obround surface 540 is provided on the cam 514 such that when rotated, the roll pin 528 and the frangible pin 526 displace in the pin displacement direction Q. The obround surface 540 slidably contacts a contact surface 542 of the flange assembly 520.

In the handle 518 rotated position shown in FIG. 13, the frangible pin 526 is completely displaced from a frangible pin lower aperture 544. If the frangible pin 526 only partially shears from a deck displacement, the frangible pin removal assembly 501 provides sufficient force to shear the frangible pin 526 at the pin aperture 530 (shown in FIG. 11).

Referring to both FIG. 11 and FIG. 13, the frangible pin 526 has a frangible pin length U. A distance to aperture V is also shown. The distance to aperture V is preselected such that when the frangible pin 526 is fully engaged in the frangible pin lower aperture 544, the pin aperture centerline 532 is located approximately along a pin aperture elevation plane T shown in FIG. 13. By controlling the pin aperture 530 location at the distance to aperture V, the frangible pin 526 can be either removed from the frangible pin lower aperture 544 if the frangible pin 526 slides freely, or sheared at approximately the pin aperture centerline 532 if the frangible pin 526 does not disengage from the pin lower aperture 544, using the frangible pin removal assembly 501.

Referring back to FIG. 10, a pair of frangible pin removal assemblies 501 are shown comprising one left handed and one right handed assembly each having the handle 518 facing a door centerline (not shown). The handle 518 can also be arranged such that both the frangible pin removal assemblies 501 have both right handed or both left handed arrangements (not shown).

Figure 14:
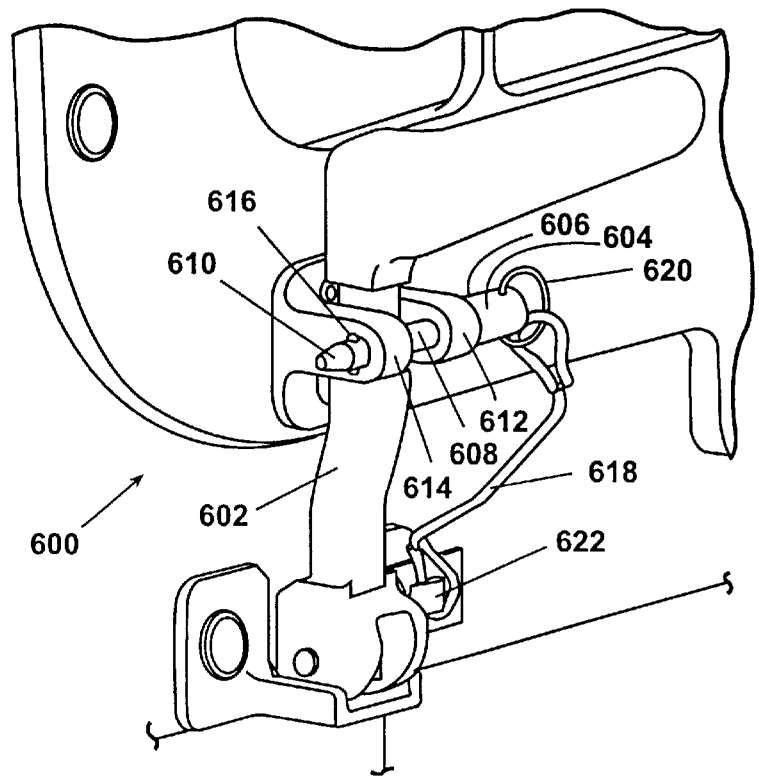
FIG. 14 is an elevation view looking aft showing another preferred embodiment of the frangible pin retraction element.

Referring to FIG. 14, an alternate embodiment from the pin removal assembly 501 shown in FIG. 12 is provided. A pin removal assembly 600 includes a lever 602 retained in a vertical normal orientation by a clevis pin 604. The clevis pin 604 includes a major body diameter section 606, a sliding pin section 608, and a tapered pin end 610. The sliding pin section 608 is slidably retained in a first clevis 612 and a second clevis 614. The clevis pin 604 includes at least one ball detent 616 adjacent to the tapered pin end 610. The ball detent 616 prevents the clevis pin 604 from vibrating loose, but permits manual removal of the clevis pin 604 by deflection of at least one spring (not shown) as known in the art upon manual removal of the clevis pin 604. When the clevis pin 604 is removed it is retained by a lanyard 618, which is attached to the clevis pin 604 by a loop 620 and attached to the door assembly by a lanyard retainer 622.

Figure 15:
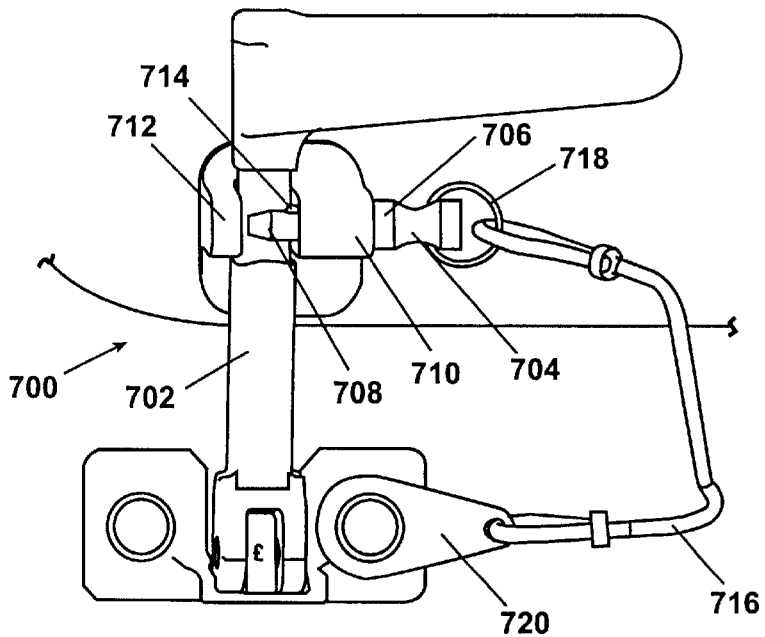
FIG. 15 is an elevation view similar to FIG. 14 showing yet another preferred embodiment of the frangible pin retraction element.

Referring now to FIG. 15, a pin removal assembly 700 is shown which is similar to the pin removal assembly 600 of FIG. 14. A lever 702 is retained in its vertical upright position by a clevis pin 704. The clevis pin 704 includes a major body section 706, and a sliding pin 708. The sliding pin 708 is slidably disposed in a first clevis 710 and abuts a second clevis 712. At least one ball detent 714 retains the clevis pin 704 within the first clevis 710 in the upright position. The at least one ball detent 714 is similar to the ball detent 616. When removed, the clevis pin 704 is retained by a lanyard 716. The lanyard 716 is attached to the clevis pin 704 by a loop 718 and the lanyard 716 is attached to the door assembly by a lanyard retainer 720.

The pin removal assemblies of FIGS. 14 and 15 provide additional preferred embodiments for pin removal assemblies of the present invention. The pin removal assemblies of FIGS. 12, 14 and 15 are all retained in their normal vertical upright positions prior to use of the lever associated with the pin removal devices.

Referring to FIGS. 16 through 18, a ball detente assembly 800 replaces a frangible device to normally retain an upper door section to a lower door section. The ball detente assembly 800 includes a threaded insert 802 which contains a deflectable ball 804. The ball 804 is partially received within an aperture 806 such that a force similar to that required to fracture a frangible pin of the present invention is required to dislodge the ball 804 from the aperture 806. The aperture 806 is formed within an upper door section 808. The ball detente assembly 800 threads into a cavity 810 formed within a lower door section 812. The ball 804 of the ball detente assembly 800 is adjustable within the aperture 806 using an adjustment tool 814 (e.g., a screwdriver or an Allen wrench). The ball 804 is biased by a compression system 816 (e.g., spring or compressible element) and deflectable in a direction W. The ball 804 is normally retained within the ball detente assembly 800 by a shoulder 818. The ball detente assembly 800 is retained and adjusted using a set of threads 820.

Figure 19:
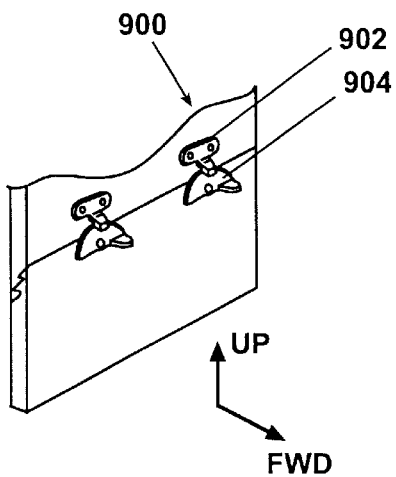
FIG. 19 is a perspective view of yet another preferred embodiment of the present invention having frangible retention bracket assemblies joining the door sections.
Figure 20:
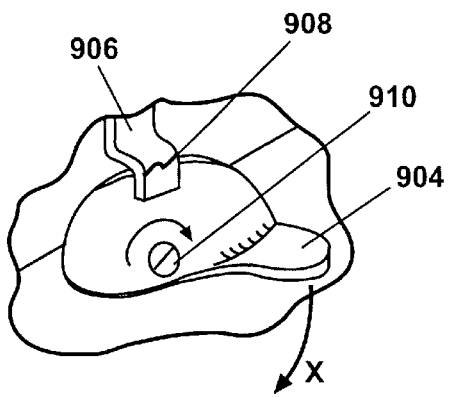
FIG. 20 is a perspective view of a single frangible retention bracket assembly shown in FIG. 19 showing rotation of the assembly and a fracture location.

Referring now to FIGS. 19 and 20, a bracket assembly 900 joining door sections includes a fixed bracket 902 and a rotating clasp 904. The fixed bracket 902 provides a frangible end 906 which fractures at a fracture location 908 such that a force similar to that required to fracture a frangible pin of the present invention is required to fracture the frangible end 906. The rotating clasp 904 rotates from an engaged position (shown) to a disengaged position (not shown) in an arc X about a fastener 910.

Figure 21:
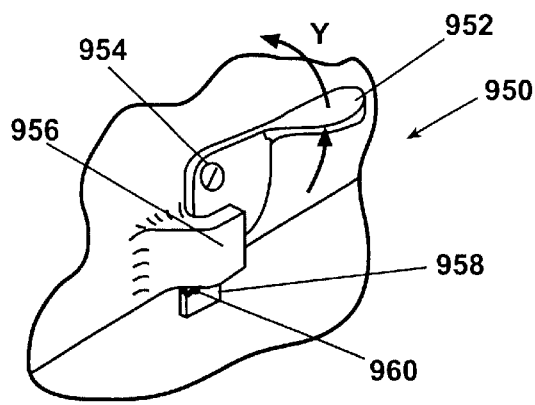
FIG. 21 is a perspective view of another preferred embodiment of a frangible bracket assembly of the present invention.

Referring to FIG. 21, an alternate embodiment of a rotating clasp assembly 950 is shown. The rotating clasp assembly 950 includes a rotating clasp 952 rotatably joined to a door upper section by a fastener 954. The rotating clasp 952 engages a bracket 956 also mounted on the door upper section. A frangible end 958 of the rotating clasp 952 fractures at a fracture location 960 such that a force similar to that required to fracture a frangible pin of the present invention is required to fracture the frangible end 958.

A flight deck door incorporating the sliding joint of the present invention provides several advantages. By reducing the size of the lower door section of the two part door assembly, the ability of an intruder from the passenger compartment of an aircraft to access the flight deck space through this smaller lower door section is greatly reduced. By using a sliding joint of the present invention, the lower door section of the door assembly cannot be dislodged from the upper door section by application of a horizontal force by a person in the passenger compartment. By using an angled sliding joint design of the present invention, a flight deck deflection caused during an emergency landing of the aircraft causes the lower door section to slidably dislodge from the upper door section. This prevents the door assembly from jamming and precluding personnel egress from the flight deck area. A combination of different displaceable element attachment means, including frangible pins as shear pins, tension fractured pins, frangible brackets/clasps and a ball détente permit the lower door section to be semi-permanently affixed to the upper door section and yet still dislodge during an emergency landing. A displaceable element removal assembly provides a positive means to manually remove the displaceable elements or shear the displaceable elements(s) not sheared during an emergency landing.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A door for separating two areas of a mobile platform comprising:
    an upper door section having a lower engagement edge;
    a lower door section having an upper engagement edge;
    said lower engagement edge of said upper door section slidably coupling with said upper engagement edge of said lower door section to form a sliding joint;
    said sliding joint being disposed between said door sections at a displacement angle measured from a horizontal plane passing through said sliding joint;
    said upper door section is joined to said lower door section by said sliding joint to cooperatively form a door assembly; and
    said sliding joint is retained in said door assembly by at least one displaceable element having a manual removal feature.

2. The door of claim 1, further comprising:
    said lower door section having at least one apertured embossment; and
    each said apertured embossment being positioned on a mobile platform operator facing side of said door assembly.

3. The door of claim 2, further comprising:
    said upper door section having at least one upper apertured embossment disposed on the mobile platform operator facing side of said door assembly;

each upper apertured embossment being aligned with a select one of said apertured embossments to form at least one embossment pair; and each said embossment pair receiving a frangible pin;

wherein a manually induced load applied to each said removal element fractures each said frangible pin, releasing said lower door section from said upper door section along said displacement angle, but wherein a horizontal human induced load applied to said sliding joint is insufficient to fracture any said frangible pin.

4. The door of claim 3, further comprising:

each said apertured embossment and each said upper apertured embossment having an aperture for receiving one of said frangible pins;

said apertures of each embossment pair being coaxially aligned; and each of said frangible pins have an outer diameter smaller than said aperture to permit each one of said frangible pins to releasably mate with a selected one of said at least one embossment pair.

5. The door of claim 4, wherein each of said frangible pins further includes a manual grasping element disposed thereon to facilitate manual removal of said frangible pins from said at least one embossment pair.

6. The door of claim 5, wherein each of said frangible pins further includes a pin aperture, said pin aperture facilitating fracture of said frangible pins.

7. The door of claim 1, wherein said displaceable element includes a rotating element and a fixed element, said rotating element being engaged with said fixed element to engage said lower door section to said upper door section.

8. The door of claim 7, further comprising:

said rotating element being connectably disposed to said lower door section by a fastener; and said fixed element being disposed on said upper door section and including a fracture location to release said lower door section from said upper door section.

9. The door of claim 7, further comprising:

both said rotating element and said fixed element being connectably disposed on said upper door section; and said rotating element having a frangible end extending over a portion of said lower door section;

wherein said frangible end fractures along a fracture location to release said lower door section from said upper door section.

10. The door of claim 1 further comprising:

each said displaceable element is formed as a ball detente assembly;

said ball detente assembly having a ball extendably biased to retain said sliding joint in said door assembly; and said ball being biased by a compression system such that said ball deflects within said ball detente assembly to release said lower door section from said upper door section.

11. A multi-section aircraft flight deck door comprising:

an upper door section having a lower edge;

said lower edge of said upper door section connectably joined to an upper member of a two-member sliding joint;

said upper member of said two-member sliding joint slidably joined to a lower member of said two-member sliding joint;

said lower member of said two-member sliding joint being connectably joined to a lower door section;

both said upper member of said two-member sliding joint and said lower member of said two-member sliding joint being connectably retainable in a joined condition by a pair of manually removable displaceable elements; and each of said displaceable elements having a rotatable element.

12. The door of claim 11, further comprising:

said upper door section having a pair of upper apertured embossments;

said lower door section having a pair of lower apertured embossments each alignable with one of said pair of upper apertured embossments forming pairs of coaligned embossments;

said pairs of coaligned embossments being positionable on a flight deck facing side of said flight deck door; and said displaceable elements being each formed as frangible pins.

13. The door of claim 12, wherein each of said pairs of coaligned embossments receive one of said frangible pins.

14. The door of claim 13, further comprising:

each said rotatable element including a cam rotatably pinned to one of said frangible pins; and each said cam being connectably joined to a lever;

wherein a tangential force applied to said lever rotatably displaces said cam withdrawing said frangible pin from said lower apertured embossment of each of said pairs of coaligned embossments.

15. The door of claim 14, further comprising:

a handle disposed at a distal end of each said lever; and each said handle being in parallel alignment with a pin rotatably joining each said cam to each said lever.

16. The door of claim 15, further comprising:

a pair of spring mechanisms disposed on said flight deck facing side of said flight deck door, each adjacent to one of said upper apertured embossments; and each said spring mechanism having a biased aperture for releasably retaining one of said levers.

17. The door of claim 16, wherein each said lever includes a notched area matably aligned with said biased aperture of said spring mechanism.

18. The door of claim 17, further comprising:

each said frangible pin having a through aperture formed approximately perpendicular to a longitudinal axis of said frangible pin; and said through aperture being locatable on said frangible pin such that said through aperture approximately aligns with a junction between said upper apertured embossment and said lower apertured embossment of each of said pairs of coaligned embossments.

19. The door of claim 18, further comprising:

each said cam being rotationally supported to said flight deck door by a flange assembly;

said flange assembly having a plate rotably supporting said cam; and said plate having a pair of opposed raised ridges preventing a twisting motion of said cam and said frangible pin about said plate.

20. A multi-section aircraft flight deck door having manual removal capability comprising:

an upper door section having a lower edge;

said lower edge of said upper door section connectably joined to an upper member of a two-member sliding joint;

said upper member of said two-member sliding joint slidably joined to a lower member of said two-member sliding joint;

said lower member of said two-member sliding joint being connectably joined to a lower door section;

both said upper member of said two-member sliding joint and said lower member of said two-member sliding joint being connectably retainable in a joined condition by at least two frangible pins; and each of said at least two frangible pins having a manual removal element.

21. The door of claim 20, further comprising:

at least two pairs of apertured embossments for receiving each of said at least two frangible pins;

each of said at least two pairs of apertured embossments having a first embossment connectably disposed on said upper door section and a second embossment connectably disposed on said lower door section;

each of said at least two frangible pins being slidably disposed in an aperture pair formed between each of said pairs of apertured embossments.

22. The door of claim 21, further comprising:

each of said at least two frangible pins being rotatably connectable to one of a plurality of frangible pin removal assemblies supportable from said upper door section; and each said frangible pin removal assembly including a lever retainable in an upright position by a clevis pin.

23. The door of claim 22, further comprising:

said clevis pin being slidably disposed in at least one clevis; and said clevis pin being releasably retained in said at least one clevis by at least one ball detent.

24. The door of claim 23, wherein each said lever is rotatably joined to one of said frangible pins for manual removal of said frangible pin from said pair of apertured embossments.

25. A door for separating two areas of a mobile platform comprising:

a door upper section having a lower engagement edge;

a door lower section having an upper engagement edge;

said lower engagement edge of said door upper section slidably coupling with said upper engagement edge of said door lower section to form a sliding joint;

said sliding joint being disposed between said door sections at a displacement angle measured from a horizontal plane passing through said sliding joint; and said door upper section joined to said door lower section by said sliding joint together form a door assembly.

26. The door of claim 25, wherein said sliding joint is retained in said door assembly by at least one frangible pin.

27. The door of claim 26, wherein said door upper section has a hinged side edge permitting rotation of said door assembly about said hinged side edge.

28. The door of claim 27, further comprising:

said lower engagement edge having at least one engagement element; and said upper engagement edge having at least one opposed engagement element to engage said lower engagement edge at least one engagement element.

29. The door of claim 28, further comprising:

said door lower section having at least one apertured embossment;

each said apertured embossment being positioned on a mobile platform operator facing side of said door assembly; and each said apertured embossment receiving one of said frangible pins;

wherein a vertical mobile platform deck load applied to said sliding joint fractures each said frangible pin, releasing said door lower section from said door upper section, but wherein a horizontal human induced load applied to said sliding joint is insufficient to fracture any said frangible pin.

30. The door of claim 29, further comprising:

said door upper section having at least one upper apertured embossment;

each said upper apertured embossment being disposed on a forward facing side of said door assembly; and each upper apertured embossment being aligned with a select one of said apertured embossments to form at least one embossment pair.

31. The door of claim 30, further comprising:

each said apertured embossment and each said upper apertured embossment having an aperture for receiving one of said frangible pins;

said apertures of each embossment pair being coaxially aligned; and each of said frangible pins have an outer diameter smaller than said aperture to permit each one of said frangible pins to releasably mate with a selected one of said at least one embossment pair.

32. The door of claim 31, wherein each of said frangible pins further includes a manual grasping element disposed thereon to facilitate manual removal of said frangible pins from said at least one embossment pair.

33. The door of claim 32, wherein each of said frangible pins further includes a notched section, said notched section facilitating fracture of said frangible pins.

34. The door of claim 32, wherein each of said frangible pins further includes an apertured section, said apertured section facilitating fracture of said frangible pins.

35. A multi-section aircraft flight deck door comprising:

an upper door section having a hinged side edge and a lower edge;

said lower edge of said upper door section connectably joined to an upper member of a two-member sliding joint;

said upper member of said sliding joint slidably joined to a lower member of said sliding joint to form a forward facing joint angle;

said joint angle being measured from a horizontal plane passing through said sliding joint;

said lower member of said sliding joint connectably joined to an upper edge of a lower door section; and said lower member of said sliding mechanical joint having a handle to facilitate manual positioning of said lower member.

36. The flight deck door of claim 35, wherein both said upper member and said lower member are formed as a machined component.

37. The flight deck door of claim 35, wherein both said upper member and said lower member are formed as a casting.

38. The flight deck door of claim 35, wherein both said upper member and said lower member are formed as a forging.

39. A releasable door joint separating upper and lower panels of an aircraft door, said joint comprising:

an upper element having a longitudinally extending upper cavity and an opposed lower engagement face;

said lower engagement face having at least one pair of a receiving slot and an extension member;

a lower element having a longitudinally extending lower cavity and an opposed upper engagement face;

said upper engagement face having at least one pair of a receiving slot and an extension member; and wherein each said receiving slot of said upper element matably aligns with each said extension member of said lower element, and each said extension member of said upper element matably aligns with each said receiving slot of said lower element to form a joint angle, said joint angle measured from a horizontal plane passing through said joint.

40. The door joint of claim 39, wherein said at least one pair of said receiving slot and said extension member of said lower engagement face and said at least one pair of said extension member and said receiving slot of said upper engagement face are co-aligned with said joint angle.

41. The door joint of claim 40, further comprising:

said upper cavity having a plurality of exterior walls perpendicularly extending about an upper seating surface;

said plurality of upper cavity exterior walls slidably encompass an upper door panel; and said upper seating surface abuts an edge face of said upper door panel.

42. The door joint of claim 41, further comprising:

said lower cavity having a plurality of exterior walls perpendicularly extending about a lower seating surface;

said plurality of lower cavity exterior walls slidably encompass a lower door panel; and said lower seating surface abuts an edge face of said lower door panel.

43. The door joint of claim 42, wherein said upper element and said lower element are slidably connected by each said extension member and said receiving slot to form a sliding joint.

44. The door joint of claim 43, further comprising:

said upper element having at least two upper apertured embossments;

said at least two upper apertured embossments coaxially align with a selected one of at least two apertured embossments of said lower element to form at least one embossment pair; and each of said at least one embossment pair slidably receives one of at least one frangible pin.

45. The door joint of claim 44, further comprising:

said upper cavity exterior walls having a plurality of fastener apertures disposed therein to each receive one of a first group of fasteners; and said first group of fasteners mechanically join said upper element to said upper door panel.

46. The door joint of claim 45, further comprising:

said lower cavity exterior walls having a plurality of fastener apertures disposed therein to each receive one of a second group of fasteners; and said second group of fasteners mechanically join said lower element to said lower door panel.

47. The door joint of claim 46, wherein said edge face of said upper door panel in contact with said upper cavity, and said edge face of said lower door panel in contact with said lower cavity are further connected with an adhesive material.

48. A method to join sections of an aircraft flight deck door, said method comprising the steps of:

forming an upper door section having a hinged side edge and a lower edge;

fastening said lower edge of said upper door to an upper member of a two-member sliding joint;

slidably joining said upper member of said sliding joint to a lower member of said sliding joint;

connecting said lower member of said sliding joint to an upper edge of a lower door section;

disposing said sliding joint between said upper door section and said lower door section at a forward facing angle measured from a horizontal plane passing through said sliding joint; and rotatably supporting said door about said hinged side of said upper door edge.

49. The method of claim 48, further comprising the step of locking said upper member of said sliding joint to said lower member of said sliding joint with a plurality of frangible pins.

50. The method of claim 49, further comprising the step of disposing a plurality of embossments on each of said upper member and said lower member to receive each of said plurality of frangible pins.

51. The method of claim 50, further comprising the step of installing a handle on said lower member of said sliding joint to facilitate manual positioning of said lower member.

* * * * *